United States Patent
Koester, Jr.

[11] 3,766,357
[45] Oct. 16, 1973

[54] HIGH POWER FACTOR PIPE HEATER

[75] Inventor: George L. Koester, Jr., Woodcliff Lake, N.J.

[73] Assignee: Haynes Electric Heating Company, Kenilworth, N.J.

[22] Filed: July 26, 1971

[21] Appl. No.: 165,977

Related U.S. Application Data

[63] Continuation-in-part of Ser. No. 44,350, June 8, 1970, abandoned.

[52] U.S. Cl. ................. 219/300, 138/33, 138/149, 138/156, 219/301, 219/535
[51] Int. Cl. ......... H05b 3/02, E03b 7/12, F16l 9/00
[58] Field of Search .................... 219/300, 301, 535; 138/32, 33, 166, 149, 156, 147

[56] References Cited
UNITED STATES PATENTS

| | | | |
|---|---|---|---|
| 2,740,095 | 3/1956 | Somes | 219/300 UX |
| 2,761,949 | 9/1956 | Colton | 219/300 |
| 1,646,599 | 10/1927 | Schaefer | 219/300 UX |
| 2,168,067 | 8/1939 | Jones | 219/300 UX |
| 3,000,433 | 9/1961 | Kemper | 138/149 X |
| 441,450 | 11/1890 | Stuart | 138/156 |
| 1,189,856 | 7/1916 | Murray | 219/105 |
| 1,727,585 | 9/1929 | Carleton | 219/300 |
| 2,489,753 | 11/1949 | Cox | 219/300 UX |
| 2,224,403 | 12/1940 | Lines | 219/300 |
| 1,651,044 | 11/1927 | Sladky et al. | 138/166 |
| 3,058,860 | 10/1962 | Rutter | 138/149 UX |

FOREIGN PATENTS OR APPLICATIONS

| | | | |
|---|---|---|---|
| 1,278,050 | 10/1961 | France | 219/300 |
| 1,382,828 | 11/1964 | France | 219/300 |
| 919,184 | 10/1954 | Germany | 219/300 |

Primary Examiner—A. Bartis
Attorney—Joseph Gray Jackson et al.

[57] ABSTRACT

A high power factor heater for industrial piping has a layer of thin (0.020 to 0.125 inch) flexible sheet electrical insualtion wrapped around the outside of a first pipe and in contact therewith. A second pipe of steel, stainless steel or nickel-chromium alloy sheet material surrounds the outside of the layer of electrical insulation in contact therewith. The sheet material of the second pipe preferably has residual stress which holds it in circular shape. In the preferred embodiment the second pipe tends to hug the first pipe within it because of the action of straps distributed along the second pipe hugging the outside.

In another embodiment of the invention, the opposite sides of the second pipe have interlocks which make the second pipe hug the insulation and pull in as close as possible to the first pipe within it. The sections of the second pipe are preferably flared at the ends and welded together end to end and the flares adjust for expansion and contraction of the second pipe.

2 Claims, 7 Drawing Figures

PATENTED OCT 16 1973 3,766,357

HIGH POWER FACTOR PIPE HEATER

This application is a continuation-in-part of my application Ser. No. 44,350, filed June 8, 1970 for High Power Factor Pipe Heater, now abandoned.

DISCLOSURE OF INVENTION

The present invention relates to heaters for piping, especially pipe lines and industrial piping.

A purpose of the invention is to surround the inner pipe, which will be the main pipe in the sense that it is more massive, with a thin electrical insulation layer following its contour and to surround the electrical insulation layer with a second pipe in close conformity with the insulation layer, so as to produce as far as possible an essentially resistive load in the resultant electric heating circuit flowing through the first or the inner pipe and through the second or outer pipe.

A further purpose is to make the outer pipe of sheet metal and to design it so that it will hug the electrical insulation and minimize the spacing between the pipes.

A further purpose is to make the sheet metal of the second pipe having a contour when in released position that is essentially circular and creates residual stresses which make it conform to the contour of the outside of the insulation.

A further purpose is to grip the second pipe along its length with straps applied under tension which make the second pipe conform firmly to the insulation and exert inward force which keeps the second pipe and the first pipe in a condition of minimum spacing.

A further purpose is to provide interlocks at the seam of the second pipe which when set in installation provide hoop stress which presses in on the electrical insulation and the first pipe to keep them in a condition of minimum spacing.

A further purpose is to join the sections of the second pipe end to end by welds assuring favorable conduction of electric current.

A further purpose is to outwardly flare the ends of the sections of the second pipe and to join the ends by welds, thus assuring favorable welding conditions without burning through the very thin thickness of the second pipe, and also assuring adjustment of the sections of the second pipe for expansion and contraction without disrupting the welds.

A further purpose is to optionally overlap the longitudinal edges of the second pipe.

A further purpose is to make the second piping of a metal having a high electrical resistance, such as steel, stainless steel, or nickle chromium alloy.

A further purpose is to envelop the outer pipe in a layer of heat insulation.

In the drawings I have chosen to illustrate a few only of the numerous embodiments in which the invention may appear, selecting the forms shown from the standpoints of convenience in illustration, satisfactory operation and clear demonstration of the principles involved.

FIG. 1 is a diagrammatic perspective of a pipe heater of the invention partially broken away.

FIG. 2 is a diagrammatic axial section of a pipe heater of the invention, exaggerating the positions of the insulation and the outer pipe to show spaces for the purpose of illustration, when in fact such spaces do not exist in the actual construction, the insulation being in engagement wtih the inner pipe and the outer pipe being in engagement with the insulation. FIG. 2 and all subsequent figures omit the heat insulation for purposes of illustration.

Figure 1:
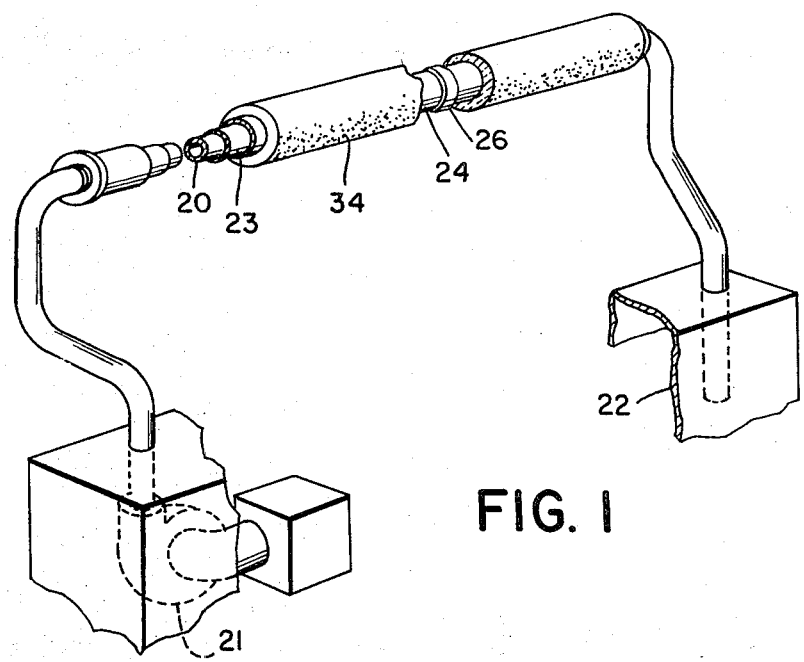

In the prior art, it is common to heat industrial piping and pipe lines by passing electric current through the pipe which contains a fluid, whether it is a liquid or a gas. Colton, U.S. Pat. No. 2,761,959, granted Sept. 4, 1956 for Prefabricated Pipe System is one embodiment, in which outer and inner pipes carry the current and are widely separated by heat insulation, which is within the outer pipe. It is also common to place strip heaters on the outside of the pipe and to pass electric current both through the strip heaters, which may be of arcuate form and through the pipe. See Kahn, U.S. Pat. No. 3,351,738, granted Nov. 7, 1967 for Pipe Heating Arrangement.

Such prior art installations have in many cases been expensive to build and expensive to operate, partly because of the power factor which has not been as high as could be desired, and the heat losses.

In some cases it is desirable to extend electric heating of piping for long distances, for example to heat pipe lines carrying petroleum in arctic areas. Because of the great length of such systems, it has become increasingly important to produce the heaters inexpensively and to make the power factor high.

I have discovered that a very inexpensive heater for industrial piping and pipe lines can be made by wrapping a thin layer of flexible electrical insulation of minimum thickness around the inner or main pipe, conforming closely to the pipe contour even if it varies somewhat from the theoretical, and then to wrap or otherwise apply an outer pipe around the inner pipe and in close conformity to the layer of electrical insulation and tending to hug the insulation and through it the inner pipe, so as to maintain a condition of minimum inductive reactance even in a shape which deviates slightly from the theoretical.

In the preferred embodiment for most installations the outer pipe can be of carbon steel, protected if desired against corrosion. In some more expensive insulations the outer pipe can be of stainless steel sheet such as 18% chromium, 8% nickel by weight. In still more expensive installations, justified in some cases by superior corrosion resistance, the outer pipe may be of nickel, chromium alloys, for example the alloy of 80% nickel and 20% chromium, or the alloy of 60% nickel, 30% chromium and 10% iron by weight.

The longer seam in the outer pipe can be left open, can simply overlap, or can where desired be provided with a tongue-and-groove or interlock arrangement which exerts hoop stress.

In the preferred embodiment, the outer pipe is closed to conform to the insulation and through it to the inner pipe by bands at intervals along its length which apply tension.

The material of the outer pipe preferably has a residual stress or curl imparted by cold working or rolling which makes it tend to form a circle in the preferred embodiment slightly smaller than the inner pipe and therefore pressing in on the insulation.

The invention will be suitable for reducing the viscosity of media flowing in pipes, such as petroleum or petroleum products, chemicals, pitch, tar, metals, plastics and other materials, for preventing freezing, for example of water and sewage, and generally to apply heat to piping in order to heat the content of the piping.

I illustrate in FIG. 1 a diagrammatic showing of an industrial pipe heater intended to be applied to a pipe line but applicable to any other suitable form of piping. An inner pipe 20 receives a fluid content from a pump 21 and discharges it at a remote point 22. That portion of the pipe which is to be heated has closely wrapped around it in engagement with the outside a thin flexible electrical insulating layer 23 having a thickness of between 0.020 and 0.125 inches, preferably having a thickness of 0.035 to 0.055 inches and most desirably in practical embodiments having a thickness of about 0.045 inches.

The insulating layer in the preferred embodiment is made of a flexible sheet of electrical insulation, for example, fiberglass cloth, with or without impregnation with an insulating plastic such as epoxy resin, polytetrafluoroethylene (Teflon TFE) or silicone rubber. The insulating layer also can be composed of a flexible sheet of polytetrafluoroethylene or silicone rubber without impregnation of the fiberglass.

The insulating layer is surrounded by a second or outer pipe 24 which is in engagement with the outside of a thin electrical insulating layer and conforms closely to its contour even though it deviates slightly from roundness and conforms as closely as possible with the contour of the inner pipe, even if the inner pipe deviates slightly from roundness. The outer pipe as applied above is preferably made of sheet metal gage carbon steel, or stainless steel or nickel chromium alloy.

Figures 3, 4:
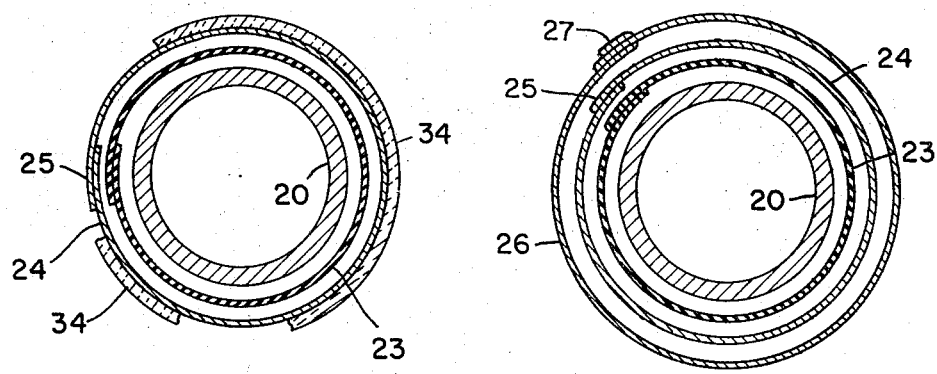
FIG. 3 is a fragmentary transverse section of the pipe heater shown in FIG. 2, exaggeratiNg the view for the purpose of illustration to show spaces between the inner pipe and the insulation and between the insulation and the outer pipe which do not in fact exist.
FIG. 4 is a transverse section as in FIG. 3 of a variation in the invention having steel straps at intervals around the outer pipe.

As an example, an inexpensive means of bringing the outer pipe in close conformity with the insulation, the outer pipe may be overlapped at 25, FIG. 3, and it preferably will have a tendency to exert an inward pressure on the insulation and the inner pipe.

Figure 6:
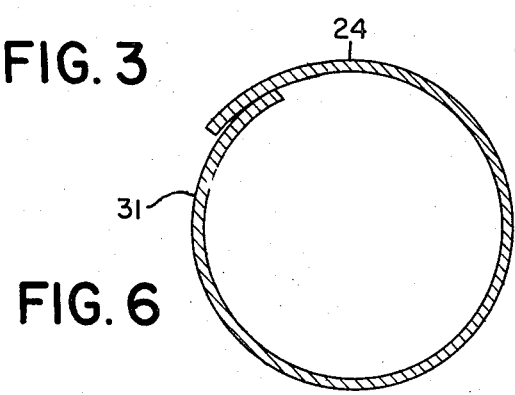
FIG. 6 is a transverse section of the sheet which makes up the outer pipe in various forms having residual stress making it tend to conform to a circle.
Figure 5:
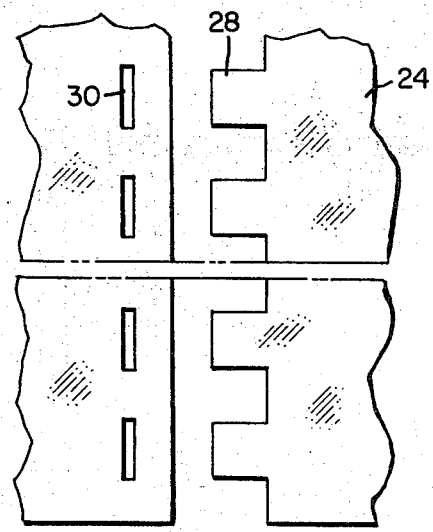
FIG. 5 is a fragmentary side elevation showing tongue-and-groove interlocks between opposite sides of the outer pipe along the longitudinal seams prior to interlocking to apply hoop stress.

In the preferred embodiment the inner pressure or hoop strip is achieved by placing and locking metal straps or bands 26 having locking points 27 around the outer pipe at intervals (FIG. 4), by interlocking the two sides of the longitudinal seam by fitting tongues 28 in recesses 30 and then bending the tongues over on themselves as with a hammer to exert hoop stress (FIG. 5), or by bending the outer pipe in sheet metal rolls to make it assume a circular form 31 (FIG. 6) which inherently applies inward acting residual stress and which preferably has a natural curvature slightly smaller than the inner pipe. It will of course be evident that the residual stress in FIG. 6 may be used in addition to the bands or straps of FIG. 4 or in addition to the interlock of FIG. 5.

These forms are particularly desirable in case the inner pipe (which may be as large as 48 to 60 inches in diameter) is slightly out of round and therefore the insulation conforming to it is also slightly out of round.

Of course it will be evident that spot welds can be located along the longitudinal seam of the outer pipe to hold the edges together.

Figure 7:
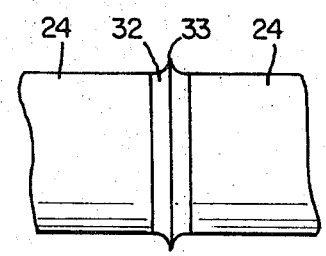
FIG. 7 is a fragmentary side elevation of a transverse joint between sections of the outer pipe in the preferred embodiment.

In FIG. 7 I show two sections of outer pipe 24 in which the ends are flared at 32 and welded at their extremities at 33 to improve conductivity. I find that the joint is much superior to others as there is less tendency of the welder to burn through the relatively thin sheet metal. This construction has substantial advantages because the outer pipe, in expansion and contraction, yields at the flares 32 and adjusts its length without damaging the weld or the pipe.

It will be evident that the outer pipe will suitably be surrounded by a layer of heat insulation 34 as well known in the art, and in most cases by a moisture barrier since the heat insulation is not effective unless moisture is excluded. The electric circuit carries the current through both the outer pipe and the inner pipe.

Figure 2:
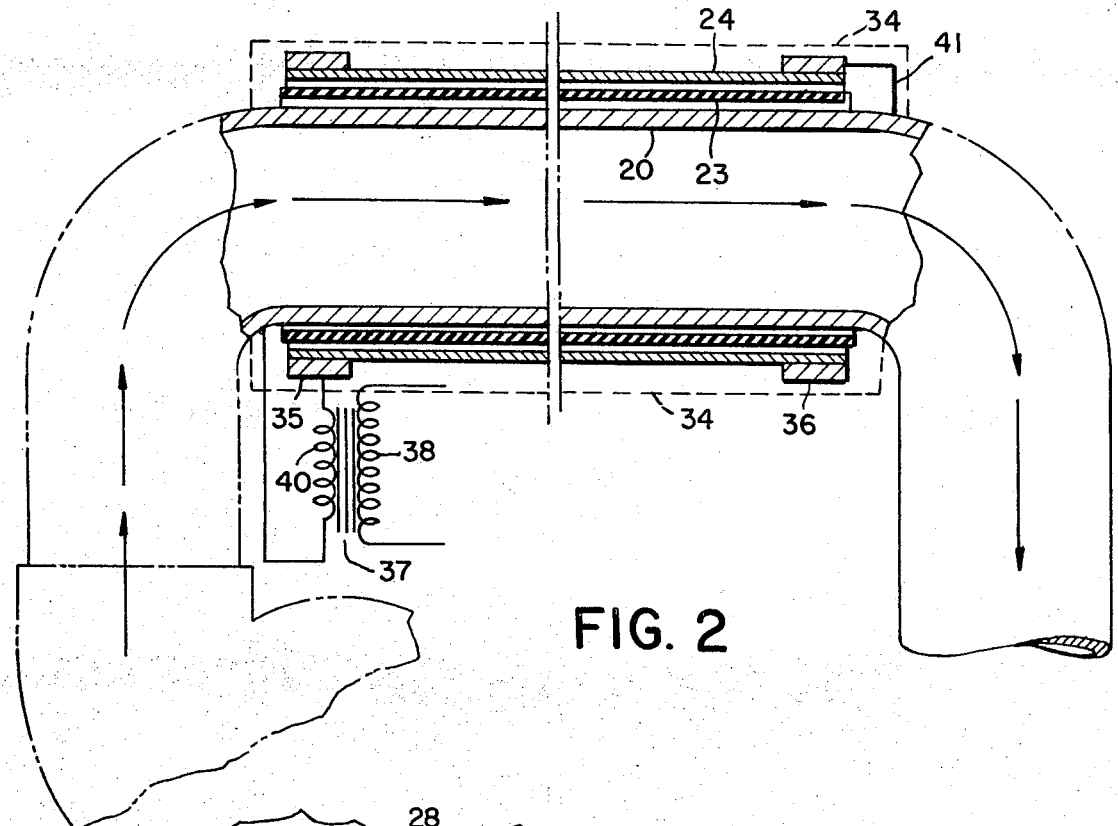

In FIG. 2 I illustrate a band-like electrical terminal 35 surrounding one end of the outer pipe and a band-like electrical terminal 36 surrounding the opposite end of the outer pipe. A transformer 37 has a primary 38 and a secondary 40, the secondary being connected at one end to the terminal 35 at one end of the outer pipe, and at the other end to the inner pipe. The terminal 36 at the other end of the outer pipe is joined to the inner pipe at that location by jumper 41. Around the outer pipe in all of the different forms I place a layer of heat insulation 34.

EXAMPLE

In order to determine the power factor, an installation is considered in which the inner pipe has an inside diameter of 3 inches and a wall thickness of ⅛ inch. It is 100 feet long made of plain carbon steel. The electrical insulating layer which is of 2 ply fiberglass impregnated with polytetrafluoroethylene is in the two examples considered of a thickness of 0.045 inches and 0.125 inches respectively. The outer pipe is in engagement with the insulating layer all around and conforms exactly to it in spite of deviations from roundness and consists of nickel chromium alloy having a thickness of 0.020 inches.

Assuming that the voltage is 235 volts AC this will maintain a current of 1,000 amperes through the pipe heater. At this voltage the charging current for the capacitor constituted by the coaxial cylinder formed by the inner pipe and the outer pipe is only about 7 amperes and the capacitance is accordingly negligible and is cancelled by the inductance of the transformer 32, at commercial frequency Depending on the thickness of the electrical insulation the inductive reactance is only 0.00097 ohms (0.125 inch thickness of electrical insulation) or 0.00036 ohms (0.045 inch electrical insulation). The resistance in series is substantial and therefore the power factor is so near to unity that the inductance does not make any difference in this installation.

Accordingly because of the configuration of the inner and outer pipes and the close spacing between the two, the piping heater of the invention is very inexpensive to operate since it is operated at unity power factor.

The device of the invention is also quite simple to construct since it merely requires wrapping insulation around the inner pipe, wrapping the sheet metal of the outer pipe around the insulation and holding the sheet metal of the outer pipe in position as by clamps, seams, welds, or otherwise.

Since the terminals surround the outer pipe, the current is flowing through the outer pipe completely around its circumference and of course the current distributes in the same way around the inner pipe, creating a very favorable current distribution without likelihood of forming hot spots.

It will be evident that the inner pipe need not function as a pipeline but may be an oven, heater or other heating means.

It will be evident from the foregoing description of this present pipe heater that this is a setup where inherently in fact a very substantial part of the heat which would be used for example to heat any cold material within the inner pipe 20 would be generated in the outer pipe 24, with its relatively high electrical resistance. It would pass from there through electrical insulation 23 inside of that outer pipe, the characteristics of which electrical insulation, including its extreme thinness as well as the type of material specified are such as not to make it also an effective thermal insulator like thermal insulation 34 outside of the outer pipe, and thence through inner pipe 20 into the material inside that inner pipe, thus quite materially adding to the heat available there. This is an important aspect of the overall special capabilities of the particular setup of the present invention in carrying out its special purpose as a heating device.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. In a heater for use at normal frequency, a first elongated metallic pipe, a layer of flexible sheet electrical insulation wrapper around the outside of the first pipe in contact with the first pipe and having a thickness of between 0.020 and 0.125 inches, a second pipe of sheet metal, in which the metal consists of a member of the group consisting of steel and an alloy of nickel and chromium, surrounding the outside of the layer of electrical insulation in contact with the outside of the insulation, electrical connections to the first metallic pipe at one end thereof, electrical connections to the second metallic pipe at the corresponding end thereof, a suitable source of electricity at commercial frequency connected across between the respective above electrical connections for the respective pipes to supply such electricity to them, and electrical means electrically connecting from the first metallic pipe at the other end thereof to the second metallic pipe at the other end thereof.

2. In a heater of claim 1, in which a layer of thermal insulation is around the outside of the second pipe.

* * * * *

PO-1050
(5/69)

UNITED STATES PATENT OFFICE
CERTIFICATE OF CORRECTION

Patent No. 3,766,357     Dated October 16, 1973

Inventor(s) George L. Koester, Jr.

It is certified that error appears in the above-identified patent and that said Letters Patent are hereby corrected as shown below:

In the first page, line 3, the assignee should be - Hynes Electric Heating Company - .

Signed and sealed this 9th day of April 1974.

(SEAL)
Attest:

EDWARD M. FLETCHER, JR.　　　　　　　　C. MARSHALL DANN
Attesting Officer　　　　　　　　　　　　Commissioner of Patents